United States Patent
Winzinger

(10) Patent No.: US 9,527,233 B2
(45) Date of Patent: Dec. 27, 2016

(54) METHOD FOR OPERATING A CONTAINER HANDLING INSTALLATION AND CONTAINER HANDLING INSTALLATION

(71) Applicant: KRONES Aktiengesellschaft, Neutraubling (DE)

(72) Inventor: Frank Winzinger, Regensburg (DE)

(73) Assignee: Krones Aktiengesellschaft, Neutraubling (DE)

( * ) Notice: Subject to any disclaimer, the term of this patent is extended or adjusted under 35 U.S.C. 154(b) by 0 days.

(21) Appl. No.: 14/761,643

(22) PCT Filed: Dec. 17, 2013

(86) PCT No.: PCT/EP2013/076916
§ 371 (c)(1),
(2) Date: Jul. 17, 2015

(87) PCT Pub. No.: WO2014/114411
PCT Pub. Date: Jul. 31, 2014

(65) Prior Publication Data
US 2015/0367555 A1    Dec. 24, 2015

(30) Foreign Application Priority Data

Jan. 22, 2013 (DE) .......................... 10 2013 100 627

(51) Int. Cl.
*B65G 29/00* (2006.01)
*B29C 49/24* (2006.01)
(Continued)

(52) U.S. Cl.
CPC ............... *B29C 49/24* (2013.01); *B29C 49/12* (2013.01); *B29C 49/36* (2013.01);
(Continued)

(58) Field of Classification Search
CPC .............................. B65G 29/00; B65G 47/088
(Continued)

(56) References Cited

U.S. PATENT DOCUMENTS

| 5,591,462 A * | 1/1997 | Darling | ................. B29C 49/80 250/223 B |
| 6,354,427 B1 * | 3/2002 | Pickel | ................... A23L 3/001 198/470.1 |

(Continued)

FOREIGN PATENT DOCUMENTS

| DE | 202004009707 | 8/2004 |
| EP | 0572107 | 1/1993 |

(Continued)

OTHER PUBLICATIONS

English Translation of PCT/EP2013/076916 International Preliminary Report of Patentability—Aug. 6, 2015.
(Continued)

*Primary Examiner* — Douglas Hess
(74) *Attorney, Agent, or Firm* — Simmons Perrine Moyer Bergman PLC

(57) ABSTRACT

The present invention includes a method for operating a container treatment installation and a container treatment installation. The container treatment installation comprises at least one container treatment device with at least one first functional element (6). The first functional element (6) comprises a first drive for at least one first work function of the first functional element (6) during active container treatment mode (AM). The container treatment installation further comprises at least one second functional element (11). The first functional element (6) comprises at least one first actuation element (7) and, in a first active container treatment mode (AM), is set such that the first actuation element (7) performs no function on the second functional element (11). For a second active container treatment mode
(Continued)

or for a third change operating mode (WM), the at least one first functional element (6) is moved and/or re-positioned or adjusted by the first drive such that the first actuation element (7) triggers or activates a function of the second functional element (11) through contact with the at least one second functional element (11).

15 Claims, 9 Drawing Sheets

(51) Int. Cl.
| | |
|---|---|
| *B29C 49/12* | (2006.01) |
| *B29C 49/36* | (2006.01) |
| *B29C 49/42* | (2006.01) |
| *B29C 49/48* | (2006.01) |
| *B65C 9/00* | (2006.01) |
| *B65G 47/84* | (2006.01) |
| *B29C 49/06* | (2006.01) |
| *B29C 49/28* | (2006.01) |
| *B29C 49/58* | (2006.01) |

(52) U.S. Cl.
CPC .......... *B29C 49/4205* (2013.01); *B29C 49/48* (2013.01); *B65C 9/0062* (2013.01); *B65G 47/846* (2013.01); *B29C 49/06* (2013.01); *B29C 2049/129* (2013.01); *B29C 2049/1266* (2013.01); *B29C 2049/283* (2013.01); *B29C 2049/4858* (2013.01); *B29C 2049/5893* (2013.01); *Y10T 156/17* (2015.01)

(58) Field of Classification Search
USPC .............. 198/377.02, 377.03, 470.1, 474.1, 575,198/617; 425/182, 537, 540
See application file for complete search history.

(56) References Cited

U.S. PATENT DOCUMENTS

| | | | |
|---|---|---|---|
| 7,140,870 B2* | 11/2006 | Nava | B29C 49/4215 198/470.1 |
| 7,399,177 B2 | 7/2008 | Brachet et al. | |
| 7,849,998 B2* | 12/2010 | Langlois | B29C 49/421 198/470.1 |
| 8,069,545 B2 | 12/2011 | Stoiber | |
| 8,167,607 B2* | 5/2012 | Linke | B29C 49/4205 198/470.1 |
| 8,202,079 B2* | 6/2012 | Litzenberg | B29C 49/4205 198/468.3 |
| 8,231,823 B2 | 7/2012 | Humele et al. | |
| 8,240,459 B2* | 8/2012 | Bernhard | B65G 29/00 198/481.1 |
| 8,287,797 B2 | 10/2012 | Voth et al. | |
| 8,651,847 B2 | 2/2014 | Hoellriegel et al. | |
| 8,807,980 B2 | 8/2014 | Meinzinger et al. | |
| 8,813,948 B2* | 8/2014 | Brunee | B65G 47/31 198/441 |
| 8,862,263 B2 | 10/2014 | Achhammer et al. | |
| 8,956,149 B2* | 2/2015 | Zacche | B29D 22/003 198/470.1 |
| 8,960,656 B2* | 2/2015 | Baumgarte | B29C 49/4205 269/55 |
| 9,045,284 B2* | 6/2015 | Turlotte | B65G 43/02 |
| 9,321,621 B2* | 4/2016 | Kitano | B67C 7/0073 |
| 2012/0100237 A1 | 4/2012 | Folger et al. | |

FOREIGN PATENT DOCUMENTS

| | | |
|---|---|---|
| EP | 2460746 | 6/2012 |
| WO | 2007033631 | 3/2007 |

OTHER PUBLICATIONS

PCT/EP2013/076916—International Search Report for Application dated Apr. 29, 2014.
DE 10 2013 100 627.2—German Search Report for Application dated Dec. 5, 2013.

* cited by examiner

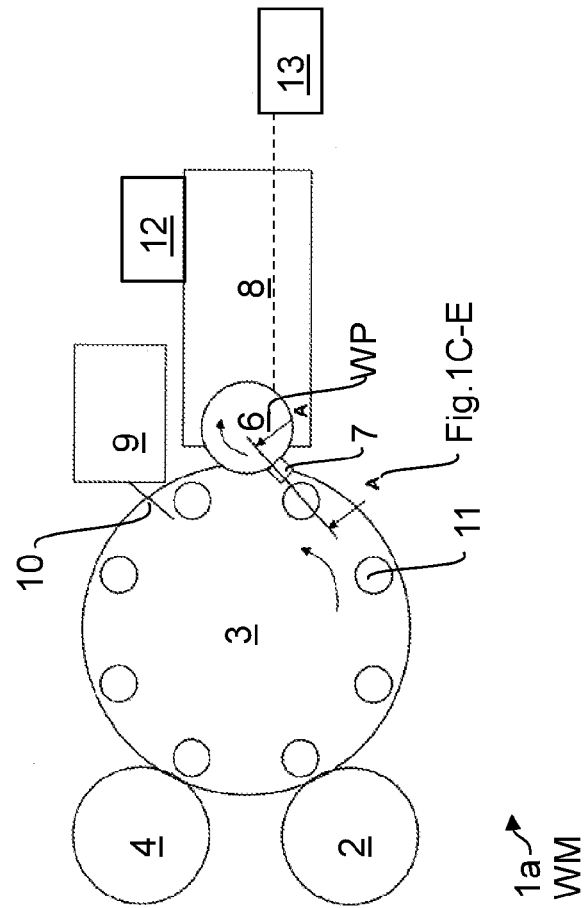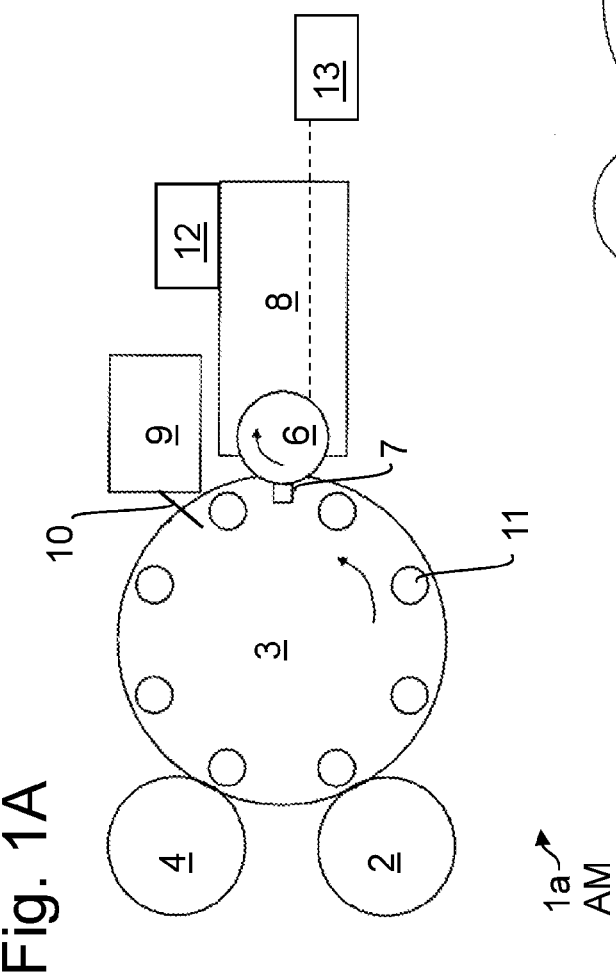

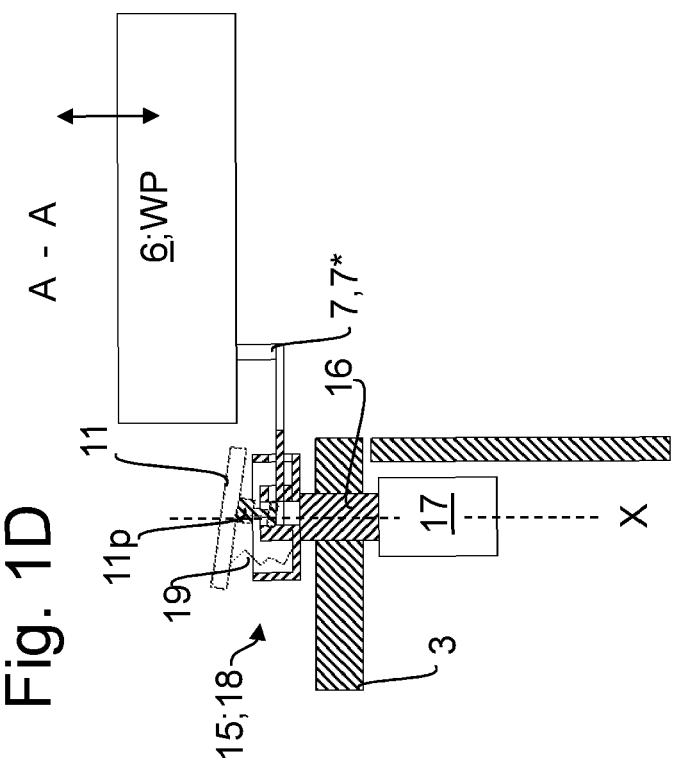
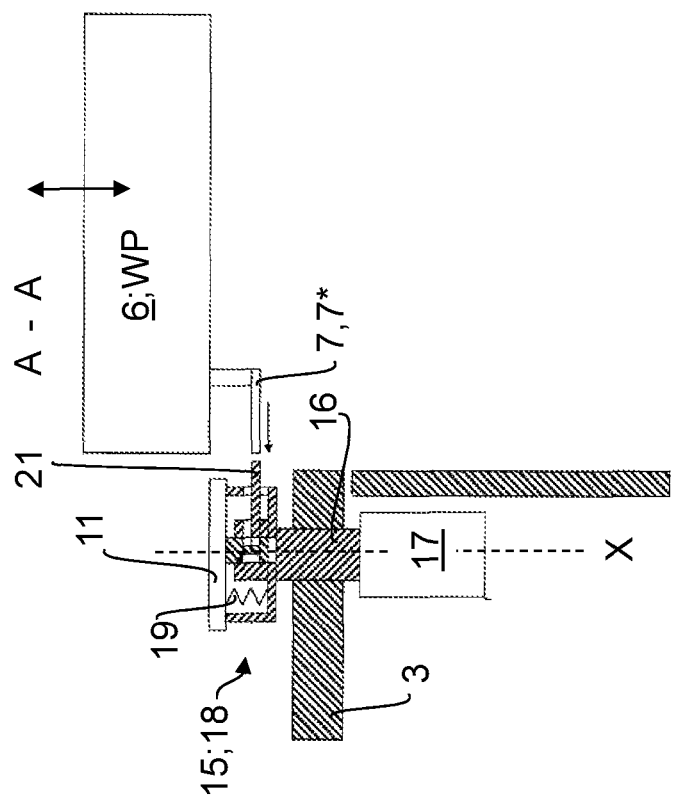
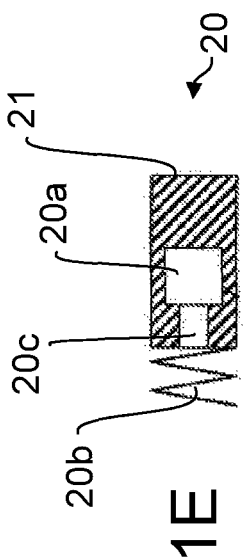

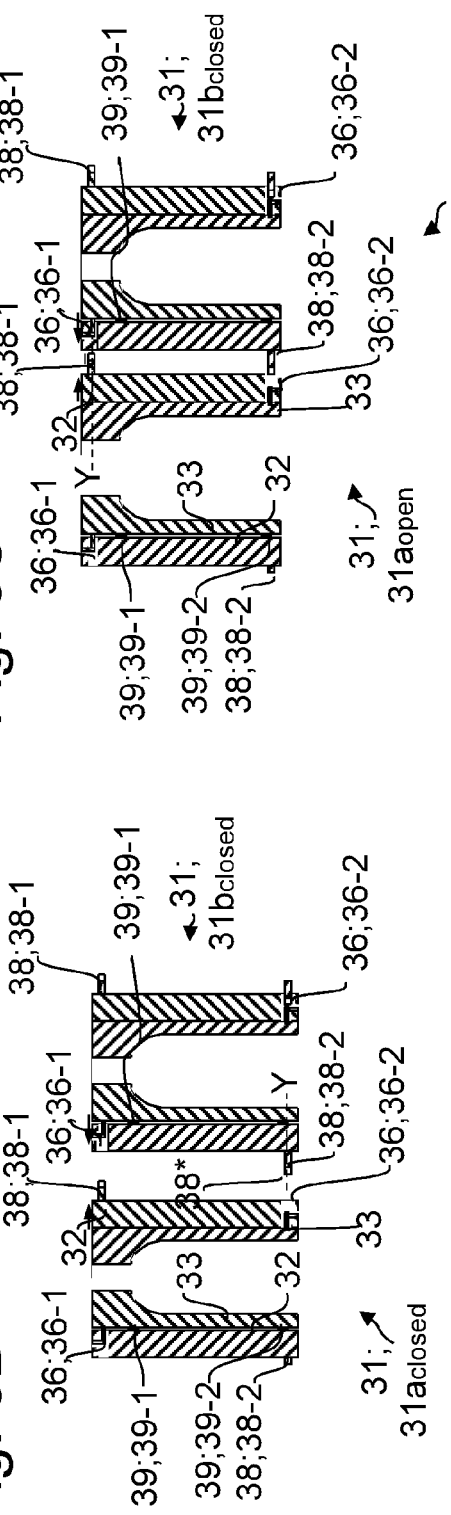

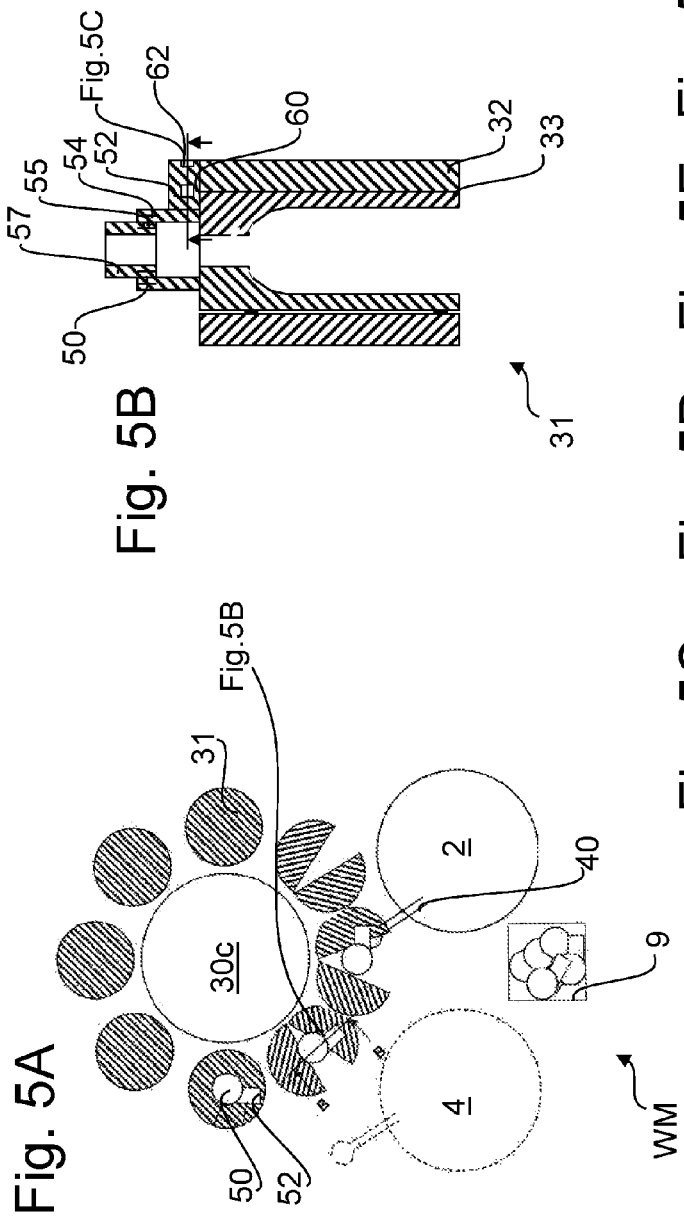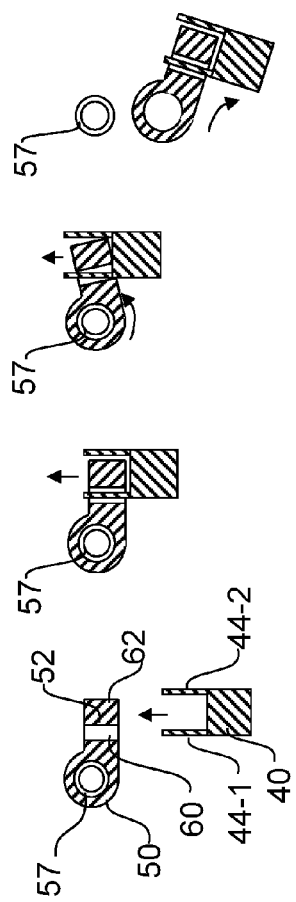

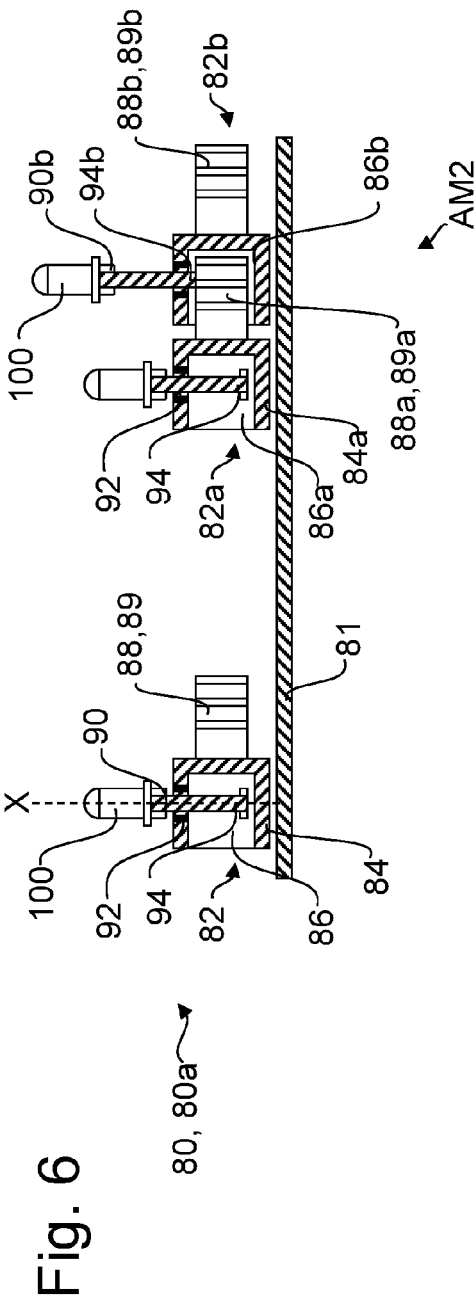
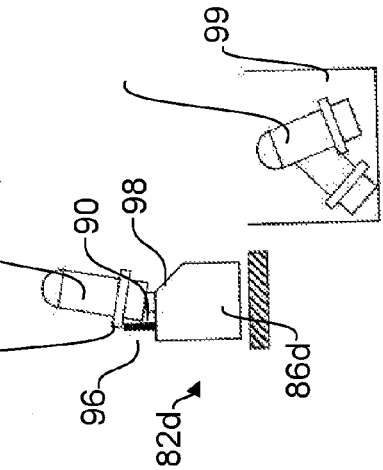
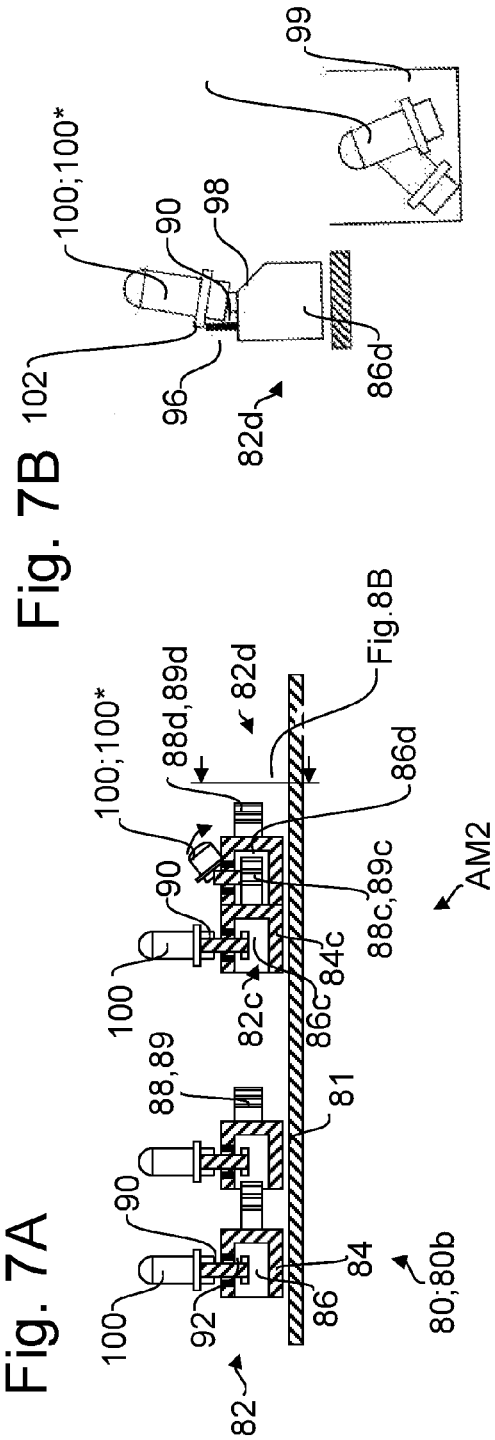
Fig. 6
Fig. 7A
Fig. 7B

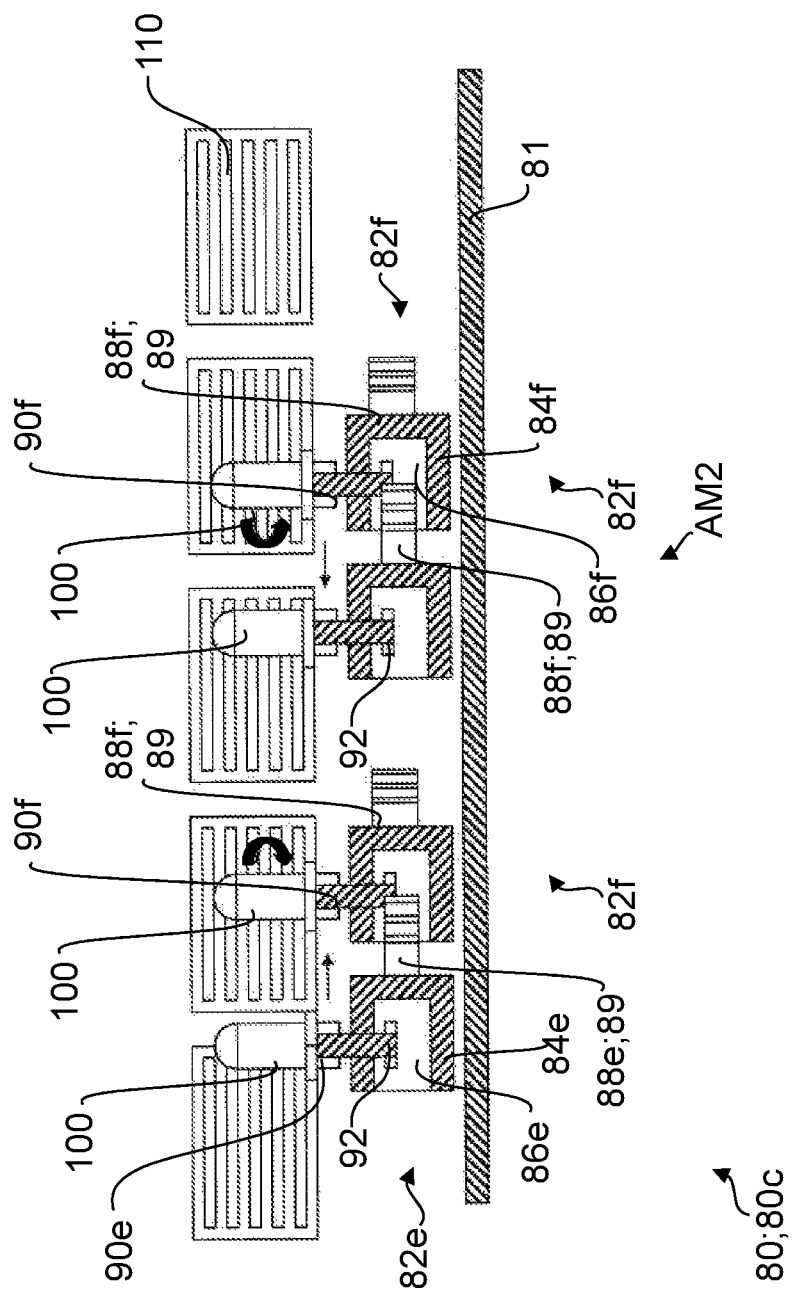

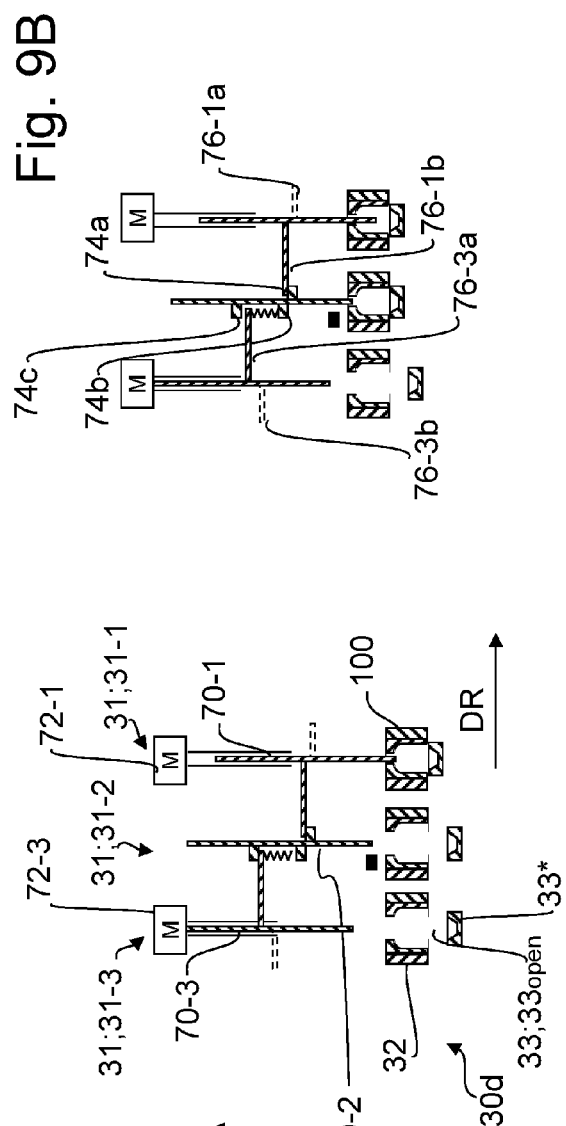
Fig. 9A
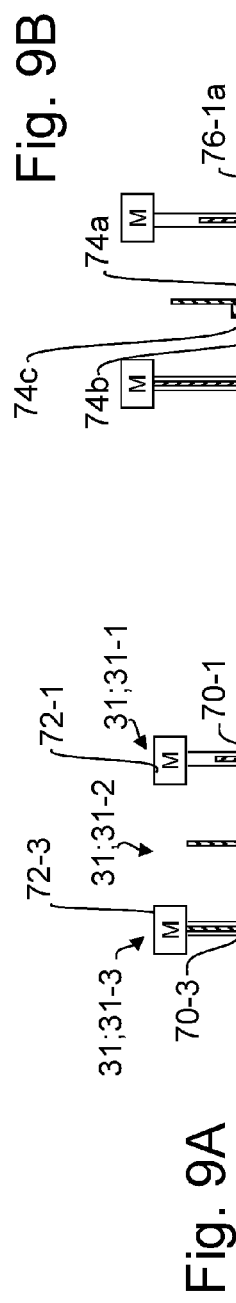
Fig. 9B
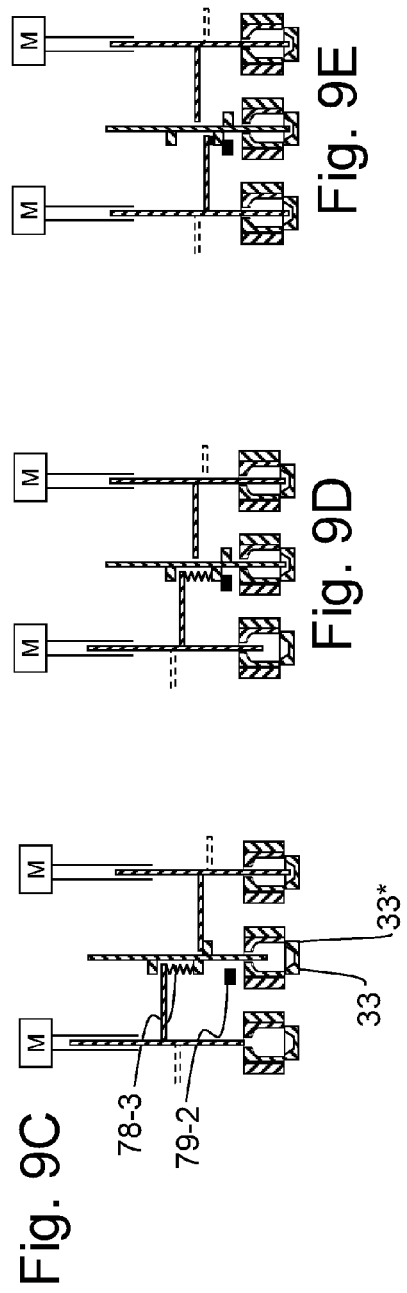
Fig. 9C
Fig. 9D
Fig. 9E

METHOD FOR OPERATING A CONTAINER HANDLING INSTALLATION AND CONTAINER HANDLING INSTALLATION

PRIORITY CLAIM

The present application is a national stage application of International application PCT/EP2013/076916, filed Dec. 17, 2013, which in turn claims priority to German Application DE 10 2013 100 627.2, filed Jan. 22, 2013, all of which are incorporated by reference.

FIELD OF THE INVENTION

The present invention relates to a method for operating a container treatment installation and to a container treatment installation according to the features shown below.

BACKGROUND OF THE INVENTION

In many industrial sectors, and in particular so in the beverage industry, i.e. in manufacturing beverage containers, filling these containers, printing labels and/or labeling these containers, and also in subsequent packaging, the appropriate container treatment installations have to be converted to the specifics of the products being respectively processed. This conversion process is frequently carried out manually, semi-automatically, or fully automated. In particular, it is necessary to exchange certain format parts, i.e., old format parts have to be dismounted and removed, and new format parts have to be mounted in or at the machine. The conversion processes have to be performed in a time-optimized manner in order to prevent long standstill periods.

DE 102009039700 A1 describes a magazine device for storing blow molding stations. After dismounting the blow molding stations from the blowing wheel, they are removed via the transport stars of the blow molding machine and fed to the magazine.

DE 102008004773 A1 describes a method for converting a blow molding machine, which method prevents long standstill periods. Particularly, at least two work areas are provided, with different processes being carried out at each work area. The automatic exchange of the blow molding stations is performed via pneumatic cylinder units, which are assigned laterally to the blowing wheel.

DE 102008049905 A1 describes a quick-change system for stretching rods. The stretching rods are composed of multiple parts, with at least two rod elements being toollessly detachable and, alternatively, connectable with each other. The rod elements are connected by an engagement member serving as rotation lock.

DE 102008050697 A1 discloses a quick-exchange blowing nozzle. The blowing nozzle in particular has a connection mechanism that allows the toolless removal of the blowing nozzle from the carrier. In this way, a manual exchange can be quickly performed.

The task of the invention is to provide a method for operating a container treatment installation and to provide a container treatment installation wherein as few additional apparatuses as possible are required for the semi- or fully automated format change.

SUMMARY OF THE INVENTION

The above task is solved by a method for operating a container treatment installation and by a container treatment installation comprising the features shown in the claims.

Further advantageous embodiments of the invention are described in the dependent claims.

The invention relates to a method for operating a container treatment installation and to such a container treatment installation. The container treatment installation comprises at least one container treatment device with at least one first functional element. The first functional element has a first drive for at least one first work function of the functional element during active container treatment mode. The container treatment installation further comprises at least one second functional element. According to the invention, the first functional element comprises at least one first actuation element. In a first active container treatment mode, the first functional element is adjusted such that the first actuation element has formed no contact with the second functional element and/or exerts no function upon the second functional element. For a second active container treatment mode or for a third change operating mode, the at least one first functional element is moved and/or re-positioned or adjusted by the first drive such that the first actuation element triggers or activates a function of the at least one second functional element of the container treatment installation through contact with this second functional element. In particular, the at least one first functional element can be moved into a position for the change operating mode, in particular into a rotary position or a linear position that is not taken by the first functional element in normal container treatment mode.

Preferably, the container treatment installation comprises a control unit, which actuates and controls the positioning of the at least one first drive. In particular, the control unit regulates the adjustment of the drive of the at least one first functional element from a work mode of the first active container treatment mode to a second active container treatment mode or to a change mode of the third change operating mode. The drives provided for the first functional elements are, in particular, servomotors.

According to one embodiment of the invention, the at least one second functional element is an exchangeable format part, which is arranged at a container treatment device by means of an attaching and detaching mechanism. Alternatively, the second functional element can also be a mechanism connected to an exchangeable format part, in particular an attaching mechanism for the format part. In the first active container treatment mode, the format part is not in contact with the actuation element of the first functional element. After adjusting or, alternatively, re-positioning the first functional element to the change mode for the third change operating mode, the actuation element of the first functional element contacts and activates the detaching mechanism of the format part, thereby detaching the attachment of the format part to the container treatment device.

Generally, the second functional element can thus be an element that is employed during the normal operating mode of the container treatment device. Possible applications are, for instance, the reception of containers for being transported or for being supported or for being fed to container treatments (filling, sealing, forming, sterilizing).

The second functional element is, in particular, arranged at the same container treatment device as the first functional element. Alternatively, the second functional element can also be a component of another, in particular of an adjacent container treatment device of the container treatment installation.

The container treatment device is, for instance, a labeling device for labeling articles with a labeling unit. The first functional element is a gripper cylinder of the labeling unit, which, by way of an actuation element, is assigned a plunger or pin member positioned below the label conveying level. During normal labeling operation, the plunger does not come into contact with the second functional element. The second functional element is a positioning means for the articles, in particular a turntable, which is arranged by means of a detachable attaching mechanism at a labeling transport star of the labeling device. The plunger is brought into contact with the passing turntables and detaches their respective attaching mechanisms by adjusting and re-positioning the gripper cylinder. In particular, a servo drive of the gripper cylinder moves to a second radial change position. The detached turntable can be transferred, for instance, via a discharge device into a collection device. Such a discharge device can be generally present or else supplied in the change mode. The detached turntables are, for instance, extracted by means of a suitable stripping apparatus and then conveyed into the collection device. The first functional element is then moved back into the operating mode and the now free positions are equipped with new turntables according to the new product.

In addition or as an alternative, the turntable can also be moved by its drive into a position where the detaching mechanism comes into engagement with the actuation element of the gripper cylinder. In the alternative detachment, the turntable would have to be positioned at the gripper cylinder during normal operation in such a manner that the actuation element of the gripper cylinder does not come into engagement with the detaching mechanism of the turntable. In the alternative detachment, the detaching mechanism is, in particular, only actuatable at certain positions along the perimeter of the turntable so that both the actuation element of the gripper cylinder and the detaching mechanism have to be fed toward each other.

The first and the second functional elements with their drives assigned for the second container treatment mode or the third change operating mode, respectively, can thus be positioned in such a manner that the function of the second functional element is triggered or activated.

It is moreover possible to exchange electrically drivable centering heads of the labeling device with a comparable mechanism. The centering head respectively intended for being exchanged is moved vertically downward in the change mode. At least one turntable acts as a first functional element. The threaded connection or the rotatably designed snap lock of the centering head is detached by a controlled rotation of the turntable, and the centering head can be removed and replaced. Preferably, the detachment for each centering head is performed at the same peripheral position of the labeling transport star such that, after one complete rotation of the labeling transport star, all centering heads are detached and can be removed and replaced by new ones.

Alternatively, the spring preload of the centering heads can be selected such that during normal container treatment mode, a bottle is normally clamped in. In change mode, the drive exerts such a pressure onto the respective turntable or onto the transport star that the detaching mechanism at the centering heads is triggered.

According to one embodiment of the invention, the container treatment device is a blow molding device with a first functional element being a first blow molding station with mold carrier and blow mold. The blow molding station has a first drive for opening the first blow mold after the blow molding process. The second functional element is a second, adjacent blow molding station. This blow molding station has a second drive for opening the second blow mold after the blow molding process. Arranged opposite each other at the external surface of the blow molding stations, each of the blow molding stations comprises at least one, preferably two actuation elements designed as unlocking means. Each of the blow molding stations can take a first and a second opening position. In the second opening position of the respective blow molding station, at least one contact is formed between the at least one actuation element designed as unlocking means of this blow molding station and the at least one unlocking mechanism of the adjacent blow molding station, with the attachment of the blow mold in the adjacent blow molding station being at least partly detachable by means of the actuation element. In particular, the unlocking means of the first blow molding station engages into an unlocking mechanism at the second blow molding station and at the same time, an unlocking means of the second blow molding station engages into an unlocking mechanism of the first blow molding station.

According to a further embodiment, the container treatment device is a blow molding device with a blowing wheel and a drive assigned to the blowing wheel. The blow molding device furthermore comprises an infeed star with gripper units and/or an outfeed star with gripper units. The blow molding stations each serve as first functional elements. A receiving pocket for a gripper unit is formed at one or between two adjacent blow molding stations. In particular, the external surfaces of adjacent blow molding stations each have two receiving sections arranged opposite each other. In the third change mode, one receiving section of a blow molding station and the facing receiving section of the adjacent blow molding station, respectively, form a receiving pocket for a gripper unit with an unlocking means. For the third change mode, the blowing wheel or the transport stars, i.e. the infeed star and/or the outfeed star, are rotationally adjusted such that the gripper units can engage, in each case, between two blow molding stations of the blowing wheel. It can be additionally provided that the blow molding stations can be opened further than during active stretch blow mode by means of their drives. The respective gripper head is unlocked from the gripper unit by the unlocking means in the respective receiving pocket, received into the receiving pockets, and removed via the blowing wheel.

According to a further embodiment, a plunger is arranged as an actuation element at each of the mold carrier halves of a blow molding station. During normal stretch blow mode, the mold carrier is assigned a drive for opening the blow mold and for releasing the product. During change mode, the mold carrier is opened further than during normal stretch blow mode by means of the respective drive such that the plunger contacts the respective adjacent mold carrier half and thus locks or unlocks the blow mold of the adjacent blow molding station. In order to be able to apply the plunger both for locking and unlocking, it can be provided that the plunger can be adjusted in two different positions for this purpose. By an appropriate mechanism it is possible, via the opening movement of the mold carrier, to respectively lock or unlock the base section of the blow mold of the respective adjacent blow molding station. The opening angle of the mold carrier halves in relation to each other can be adjusted, for instance, by a retractable cam or by an electric drive for the purpose of opening arranged at the blow molding stations.

According to a further embodiment, the stretching rod of a blow molding station can function as the first functional element in order to lock or unlock the base section of the blow mold as the second functional element of this blow molding station. In this instance, a detaching mechanism is provided in the center of the base section. This detaching mechanism is highly preloaded, as it has to withstand the blowing pressure. The detaching mechanism is triggered by the power of the stretching rod drive that has been moved further downward in the change mode. At the same time or as an alternative, it is also possible by moving the stretching rod further downward to apply the stretching rod drive for activating a detaching mechanism of the blowing nozzle as the second functional element. In this instance, a safety mechanism has to be provided, because detaching the blowing nozzle is only possible if the base section of the blow mold has already been removed. For the change mode, the pneumatic drive of the stretching rod is adjusted by means of a control or by means of a further drive or by means of a retractable cam such that the stretching rod can move a bit further downward in the change mode than in the normal stretch blow mode. In particular, this is effected at an appropriately reduced speed, at which it is ensured that the format parts are not damaged. In order to enable easier adjustment, the stretching rod drive can also be an electric drive, in particular a servo drive or a linear drive.

According to a further embodiment, the blowing nozzle is lowered so far within the blow molding station that it is clasped by the mold carrier halves when these are closed. By means of the stretching rod as actuation element, the blowing piston, which is not to be exchanged, can be separated from the blowing nozzle.

According to a further embodiment, the container treatment device is also a blow molding device. The blowing wheel comprises blow molding stations with blowing nozzles, stretching rods, and blow molds. In this embodiment, in each case one gripper unit of the infeed star and/or of the outfeed star respectively form one first functional element. In this instance, at least one gripper arm is designed as an actuation element. The blowing nozzles, stretching rod, or blow molds, respectively, form a second functional element. For the third change operating mode, the infeed star and/or the outfeed star is rotationally adjusted such that the gripper units of the infeed star and/or of the outfeed star, respectively, engage into the blow molding stations and unlock the blowing nozzles, stretching rods, or blow molds by means of the gripper arm, and, in particular, also remove them from the blowing wheel.

According to a further embodiment of the invention, the container treatment device comprises at least one second functional element, which is identical or at least largely identical to the first functional element and which also comprises an actuation element and a drive. In a second active container treatment mode, the first functional element is moved by the first drive such that the first actuation element acts on the second functional element and triggers an adjustment or a further function of the second functional element. In particular, a plurality of identical functional elements will be arranged consecutively in a series. In this instance, the drive can in each case specifically control at least one of the functional elements. This functional element being presently controlled functions as the first functional element and specifically activates the function of at least one adjacent functional element. The adjacent, activated functional element thus forms the second functional element of the container treatment installation.

According to a further embodiment, the container treatment device is a transport system with a plurality of transport units. Each of the transport units has its own drive, a receiving section for an activating element, and an activating element. Each transport unit can take a first work position, in which it can be applied as the first functional element, and a second work position, in which it functions as the second functional element. Each transport unit functioning as first functional element can serve as a simple transport unit for bottles, preforms, or other containers in a first active container treatment mode. In a second active container treatment mode, it can trigger a function of an adjacent transport unit by its activating element engaging into the receiving section of this adjacent transport unit, which, in this constellation, forms the second functional element.

Preferably, the transport system is a system with magnetically movable transport units, which are moved along a rail system. Each transport unit has a detaching mechanism for the gripping or holding element arranged on it, which gripping or holding element can be actuated by the actuation element of a succeeding transport unit. According to one embodiment, the gripping or holding element is detached from the transport unit and can simply be removed or ejected into a collection device. Alternatively, the actuation element of the succeeding transport unit can also effect a detachment of the transported article arranged at the gripping or holding element, which article is subsequently simply removed or ejected into a collection device. According to a further embodiment, it can be provided that defective transport units are detected, coupled with the succeeding transport unit by an actuation element, and transported out of the system by said succeeding transport unit.

Each transport unit can furthermore have a lever or the like for lifting and lowering the articles being transported. When the article is to be ejected, the succeeding transport unit approaches close to the preceding transport unit so that the actuation element of the succeeding transport unit actuates the lever of the preceding transport unit. The article is lifted such that it is ejected by means of a stripper rail. Other functions are possible in individual container treatment devices. For instance, it can be provided that the actuation element of the succeeding transport unit effects a vertical movement of the gripping or holding element of the preceding transport unit or a rotational movement of the gripping or holding element of the preceding transport unit. In particular, this can be employed together with preferential heating. A gearwheel, for instance, is arranged at the gripping or holding element. On being lifted by the activation of an actuation element, this gearwheel can contact a gear rack arranged along the heating device such that the gradually required rotary drive for peripheral heating can be generated indirectly via a linear drive.

According to a further embodiment, each transport unit includes a lever or the like for controlling the gripping or holding element of the transport unit for the articles being transported. In the instance of a collision occurring during transport and a consequent defect of the articles or of an inspection apparatus detecting a defect of the respective article being transported, the lever is actuated by the actuation element of a succeeding transport unit and the article is detached from the transport unit. Preferably, this is carried out at defined positions within the container treatment installation, where appropriate collection devices, in particular stationary ones, are provided.

The succeeding transport unit with actuation as the first functional element has been described above by way of example. Alternatively, the actuation element can, in each case, be arranged at the transport unit such that the preceding transport unit, in each case, acts as the first functional element, which triggers a function of the succeeding transport unit.

The method of activating a second functional element by a first functional element with an actuation element can be advantageously employed, in particular, at further container treatment devices of the container treatment installation. In filling technology, for instance, the respective base plate can be actuated by means of a detaching mechanism at the valve head, etc.

Furthermore, it can be provided that the first and the second functional element, while both performing the same function in the container treatment device, are differently constructed. In particular, the second functional element does not comprise its own drive, but is rather driven by means of an actuation element of the first functional element. The container treatment device is, for instance, a blow molding device with a plurality of blow molding stations. A first stretching rod of a first blow molding station has a first drive and at least one first driver element. Furthermore, a stretching rod of a third, succeeding blow molding station has a second drive and at least one third driver element. The middle stretching rod of a second, middle blow molding station, which stretching rod is arranged between a first and a third stretching rod, does not have a drive of its own. Instead, this second, drive-less stretching rod has at least one, preferably two engagement elements for the first driver element and at least one engagement element for the driver element of the third, succeeding blow molding station, and forms the second functional element. This second functional element is driven by the drives of the adjacent first and third stretching rod and can thus perform its own function without having a drive of its own. In this embodiment of the invention, the second container treatment mode relates only to retracting or, alternatively, extending the stretching rod, for instance.

The invention in particular proposes assigning an actuation element to at least one driven functional element, which actuation element, due to the given movement patterns, is not employed in the active production mode. By means of its drive, however, the functional element can be moved to a second position in a second operating mode or in a third change mode. In this position, a mechanism is triggered by the actuation element at the format part, by which mechanism the format parts are released for easier removal. Alternatively, it can also be provided that format parts are locked and thus attached by the actuation element. In particular, at least one drive thus performs a dual function by effecting the normal function of a first functional element during container treatment mode. By adjusting the first functional element via the drive, the functional element can perform a function on the second functional element or, alternatively, on the format part, in a second active container treatment mode or in a third change operating mode.

In particular, the container treatment device according to the invention is a circulating machine with a multitude of container treatment units arranged at its perimeter. The container treatment units are particularly arranged equidistantly at the perimeter of a circulating carrier of the machine. The machine is preferably operated continuously, wherein the containers to be treated are transported continuously during their treatment in the normal operating mode, i.e. in the first active container treatment mode and/or in the second active container treatment mode. For a third change mode, it is possible to provide both a continuous operating mode and a clocked operating mode. The speed of the continuously performed third change operating mode can differ from the speed of the normal operating mode; in particular, the machine is operated at less than half of the angular velocity in the change mode.

According to a further embodiment, it is also possible, however, to provide a clocked normal operating mode, in which the containers are conveyed discontinuously. The clocked operating mode can then be provided both for a work mode and for the change mode.

In the following passages, the attached figures further illustrate exemplary embodiments of the invention and its advantages. The size ratios of the individual elements in the figures do not necessarily reflect the real size ratios. It is to be understood that in some instances various aspects of the invention may be shown exaggerated or enlarged in relation to other elements to facilitate an understanding of the invention.

BRIEF DESCRIPTION OF THE FIGURES

FIGS. 1A and 1B show a first embodiment of a labeling device with dual drive function according to the present invention.

FIG. 1C and 1D show the attaching apparatus for attaching the turntables at the labeling transport star.

FIG. 1E shows in detail a top view of the element of the bayonet lock according to FIG. 1C and 1D.

FIG. 5 show a further embodiment of a blow molding device with dual drive function according to the present invention.

FIGS. 6 to 8 show different embodiments of a shuttle system with dual drive function according to the present invention.

FIG. 9 show three blow molding stations of a further embodiment of a blow molding device with dual drive function.

DETAILED DESCRIPTION OF THE INVENTION

Figure 3A:
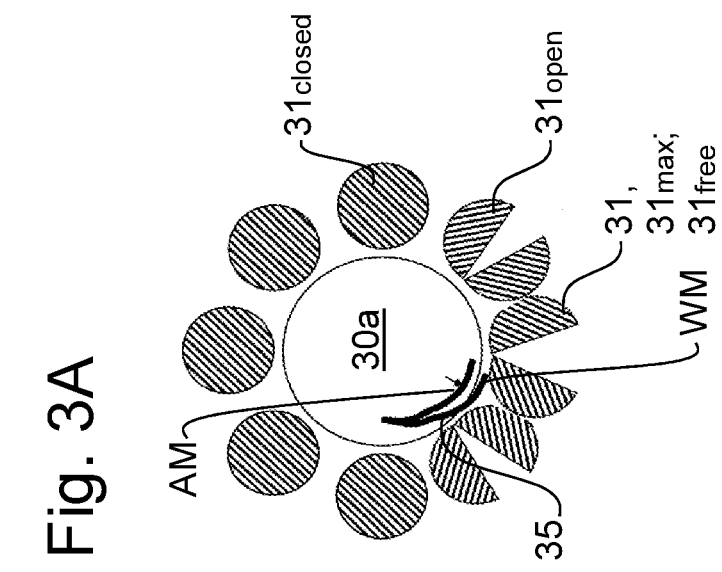
FIG. 3 show embodiments of a blow molding device with dual drive function according to the present invention.

The same or equivalent elements of the invention are designated by identical reference characters. Furthermore and for the sake of clarity, only the reference characters relevant for describing the respective figure are provided. It should be understood that the detailed description and specific examples of the device and method according to the invention, while indicating preferred embodiments, are intended for purposes of illustration only and are not intended to limit the scope of the invention.

FIGS. 1A and 1B show a first embodiment of a labeling device 1a with dual drive function according to the present invention. The articles to be labeled by the labeling device 1a, in particular bottles or cans, are fed to the labeling transport star 3 via an infeed star 2. The labeling transport star 3 comprises turntables 11, on which articles are arranged for the labeling process and are guided past a labeling unit 8. The labeling unit 8 comprises a gripper cylinder 6. The labels are picked up by the gripper cylinder 6, for instance, by being withdrawn from a magazine 12, applied onto the articles, and firmly pressed on.

A plunger 7 is arranged at the gripper cylinder 6 in a position below the label conveying level. The plunger 7 does not come into contact with the turntables 11 in normal work mode AM, i.e. in the normal labeling mode (FIG. 1A). Like in a gear connection, the plunger 7 passes in between the turntables 11, as it were. In the instance that the turntables 11 need to be exchanged for a product change, the drive of the gripper cylinder 6 is controlled by a control unit 13 in such a manner that the gripper cylinder is radially moved into a change position WP (FIG. 1B, labeling device 1a in the change mode WM). In particular, due to the rotation of the labeling transport star 3, the plunger 7 then comes into contact with the turntables 11 passing it, and it can actuate the detachable attaching apparatus 15 at the turntables 11 and thus detach the connection between turntable 11 and labeling transport star 3 such that the turntable 11 can be removed by the operator or transferred into a collection device 9 by a stripper and slide 10. The slide 10 can already be present during normal operation AM or be specifically supplied in the change mode WM. There can also be two or even more plungers 7 at one gripper cylinder 6 (not illustrated).

FIGS. 1C and 1D show the attaching apparatus 15 for attaching the turntables 11 at the labeling transport star 3, which attaching apparatus 15 can be detached by the plunger 7 (cf. FIGS. 1A and 1B). The attaching apparatus 15 is arranged at the free upper end of a longitudinal axis X of a shaft 16, via which each individual turntable 11 is driven by means of its own drive 17. The plunger 7 particularly serves as lever 7* for unlocking a bayonet lock 18. This bayonet lock 18 comprises a spring 19, which is preloaded during normal labeling mode. By being pressed with the plunger 7, the bayonet lock 18 is actively unlocked. In particular, the spring 19 relaxes and the turntable 11 is lifted upward and can then be removed either manually or by means of a stripper and slide 10 (cf. FIGS. 1A and 1B).

In FIG. 1E, the element 20 of the bayonet lock 18 is illustrated in a top view (rotated by 90° in relation to FIG. 1C), which element 20 is contacted by the plunger 7* on the right side of the illustration. This element 20 is provided with a recess 20a in its center, through which recess 20a a mushroom-shaped attaching element 11p arranged at the underside of the turntable 11 can be pulled out. In the operating position (cf. also FIG. 1C, which shows the change mode prior to the engagement by the plunger 7, 7*), a free end 21 of the element 20 arranged opposite a pressure spring 20b of the element 20 is arranged at the attaching apparatus 15 in such a manner that it is pressed by the pressure spring 20b into a position where the mushroom-shaped attaching element 11p is positioned below the narrower recess 20c of the element 20. This recess 20c is narrower than the thicker part of the mushroom-shaped attaching element 11p so that the latter is held form-lockingly in the attaching apparatus 15 together with the turntable 11. By the engagement of the plunger 7*, the free end 21 of the element is shifted against the force of the pressure spring 20b to the left side into the detaching position of the bayonet lock 18.

Figure 2:
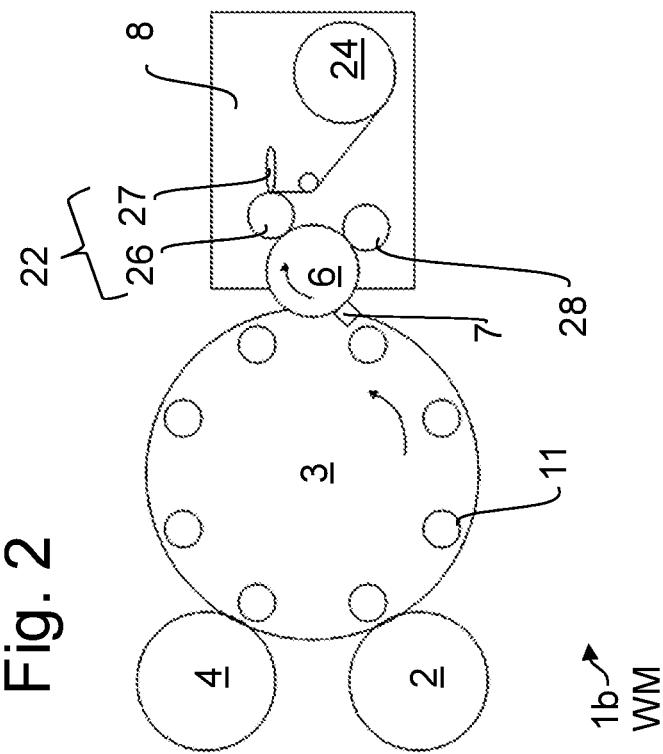
FIG. 2 shows a second embodiment of a labeling device with dual drive function according to the present invention.

FIG. 2 shows a second embodiment of a labeling device 1b with dual drive function according to the present invention in the change mode WM. The basic structure of the labeling device 1b corresponds to the first embodiment 1a described above. In the labeling device 1b, the label material is supplied as endless material on a roll 24. The labels are appropriately cut to length by means of a cutting device 22 consisting of cutting blade 27 and counter-cutting roller 26, coated with glue on one side at a glue roller 28, and applied onto the articles by the gripper cylinder 6.

In the first change mode WM, the turntables 11 are detached as described in the context of the FIG. 1. In a second change mode (which is not illustrated), the drive of the gripper cylinder 6 is controlled by the control unit 13 such that the plunger 7 can detach and/or adjust the glue roller 28 or the counter-cutting roller 26. The actuation is carried out, for instance, according to the embodiment of an attaching apparatus 15 described in the FIGS. 1C to 1E.

It would alternatively be conceivable to install a plunger at the glue roller 28 or at the cutting roller 26 and to use it for detaching the gripper cylinder 6 or segments of it for a change.

FIG. 3 show embodiments of a blowing wheel 30a of a blow molding device with dual drive function according to the present invention. In the closed blow molding stations $31_{closed}$, so-called preforms (not illustrated) are brought into the desired form by stretch blow molding. After that, the blow molding station 31 is opened, and the finished bottle is taken out and removed.

According to FIG. 3A, the drive, which is required for the normal operating mode for opening the respective blow molding stations 31 ($31_{open}$) after completion of the product, is used for unlocking a lock of the adjacent blow molding station 31 and thus enabling easier exchange thereof. In particular, at least one cam controlled drive 35 is used for opening the blow molding stations 31. In the work mode AM, i.e. in normal production mode, the drive 35 transfers the blow molding station 31 to a first open position $31_{open}$. In the change mode WM, the cam of the drive 35 is adjusted and further opens the respective blow molding station 31 to a maximally opened position $31_{max}$. In this context, a lever 38 (cf. FIGS. 3B to 3D) of the opening blow molding station 31 engages with a quick lock of the adjacent blow molding station 31, which quick lock releases the restraint of the mold halves of the blow molding station 31. In the change mode WM, an unlocking mechanism is thus actuated, which disconnects the connection between blow molding station 31 and blow mold 33 and thus transfers the blow molding station 31 to an unlocked state $31_{free}$. The opening movement of the blow molding station 31 can be performed via the described cam controlled drive 35. Alternatively, it is also possible to use a servomotor or an extra opening cam in the same or in a separate section of the blowing wheel 30a. FIG. 3A shows how the cam of the drive 35 is fed to the radially outer position for the change mode WM. As a result, the lower blow molding station 31 (in the figure at the 6 o'clock position) is opened further than the blow molding station 31 at the 4:30 o'clock position, which was still opened by the same cam of the drive 35, but in its position for the normal work mode AM. The cam of the drive 35 remains open in its change mode position WM for at least as long until all blow molding stations 31 have passed once while circling around the blowing wheel 30a. In order to close the blow molding stations 31 again after exchanging the blow molds 33, a closing cam (not illustrated) of the drive 35 is provided, which closes the blow molding stations 31 again. In particular, this closing cam of the drive 35 can additionally be moved into two positions for two modes, i.e. change mode WM and work mode AM.

According to the embodiment of the invention illustrated in FIG. 3B to 3D, the drive 35 (cf. FIG. 3A) for opening the blow molding stations 31 can also be used to effect a simultaneous, partial detachment of blow molds 33 of adjacent blow molding stations 31. The blow molding stations 31 particularly comprise a mold carrier 32, in which the blow mold 33 is arranged that is respectively adjusted to the product. For this purpose, the blow molding stations 31 comprise at least one unlocking mechanism 36 and at least one unlocking means 38 arranged on the opposite side. A blow molding station 31a preferably comprises a first unlocking mechanism 36-1 arranged in an upper section of the external surface, and a first unlocking means 38-1 in the form of a pin or the like on the opposite external surface. Furthermore, the blow molding station 31*a* comprises a second unlocking mechanism 36-2 arranged in a lower section of the external surface opposite the first unlocking mechanism 36-1, and also a second unlocking means 38-2 in the form of a pin or the like arranged on the opposite external surface.

FIG. 3B shows a first work mode AM1 with two adjacent, closed blow molding stations $31a_{closed}$ and $31b_{closed}$, as are present during the stretch blow molding process, for instance. FIG. 3C shows a second work mode AM2 with an opened left blow molding station $31a_{open}$ and a closed right blow molding station $31b_{closed}$, in which the stretch blow molding process, for instance, has not been completed yet. The blow molding stations 31*a*, 31 *b* do not have any points of contact in this state. By means of the drive 35 (cf. FIG. 3A), the left blow molding station 31*a* can now be transferred, according to FIG. 3D, to a maximally opened form $31a_{max}$ for the change mode WM. The upper unlocking means 38-1 of the blow molding station 31*a* then engages into the upper unlocking mechanism 36-1 of the blow molding station 31*b*, and the lower unlocking means 38-2 of the blow molding station 31*b* engages into the lower unlocking mechanism 36-2 of the blow molding station 31*a*. This causes the lower attaching means 39-2 of the left blow molding station 31*a* and, at the same time, the upper attaching means 39-1 of the right blow molding station 31*b* to become detached. The blow molds 33 are thus partly detached from the mold carriers 32, i.e. the blow molding station 31*b* is in a partly unlocked state $31_{part-input}$. Accordingly, the respectively unlocked blow mold half 33 of the mold carrier 32 assigned to it can be removed manually or automatically by a robot or the like without having to use any additional tools, since the blow mold 33 is arranged loosely suspended in the mold carrier 32. In addition, the upper unlocking mechanism 36-1 of the left blow molding station 31*a* is detached by the upper unlocking means of the further blow molding station (not illustrated) arranged at the left of the blow molding station 31*a*. In order to also enable detaching the lower unlocking mechanism 36-2 of the right blow molding station 31*b*, it is necessary to transfer the further blow molding station arranged at the right of the blow molding station 31*b* to a maximally opened form (not illustrated). For the sake of simplicity, FIG. 3 only shows how the blow molding station 31*a* opens. It is just as well possible that both adjacent blow molding stations 31*a*, 31*b* open at the same time and the blow molds 33 are detached from the respectively adjacent mold carrier 32 of the respectively adjacent blow molding station 31.

The blow molds 33 or the unlocking mechanism 36, as the case may be, can then have a hook, which is journaled pivotally in the blow mold 33 about an axis Y. In normal operation, the end of the hook is arranged in an undercut of the mold carrier 32 for the purpose of holding the blow mold 33 in the mold carrier 32. In the instance of the inclined surface coming into contact with the hook, the hook is set into rotation. In this instance, the free end 38\* of the unlocking means 38-1, 38-2 is designed as an inclined surface. By the rotation of the hook about the axis Y, the hook can overcome the undercut and is released, with the result of the respective unlocking mechanism 36-1, 36-2 becoming detached. So that the blow mold 33 does not simply fall off after detachment, it still remains suspended from a not illustrated projection of the mold carrier 32.

Figure 4:
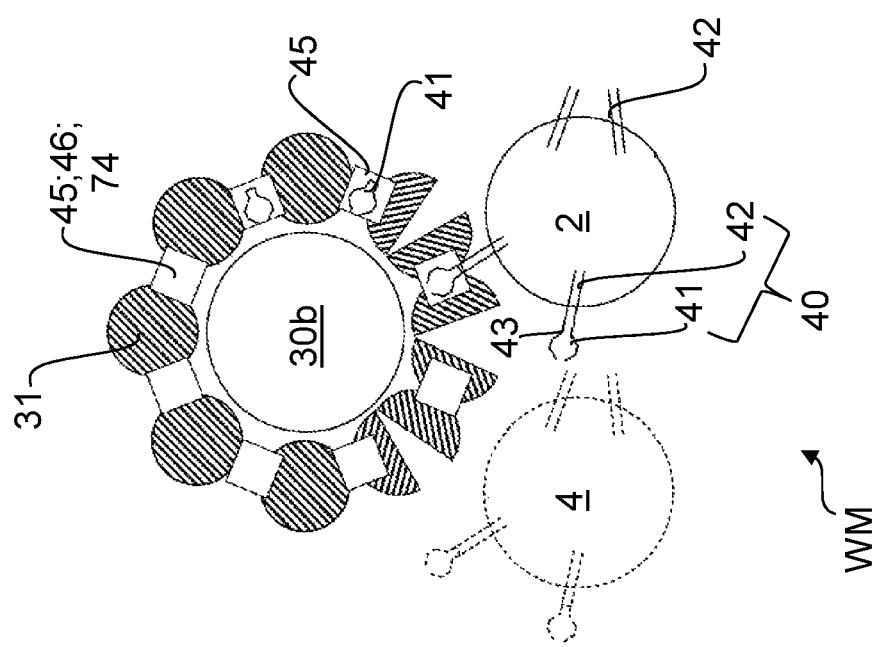
FIG. 4 shows a further embodiment of a blow molding device with dual drive function according to the present invention.

FIG. 4 shows a further embodiment of a blowing wheel 30*b* of a blow molding device with infeed star 2 and/or outfeed star 4 with dual drive function according to the present invention. The blow molding stations 31 of the blowing wheel 30*b* or the blowing wheel itself (between the blow molding stations 31) each have receiving devices 45 for the gripper 40 of the infeed star 2 and/or of the outfeed star 4. The grippers 40 of the infeed star 2 and of the outfeed star 4 each consist of a gripper head 41 at at least one holding arm 42. The three transport stars, i.e. the infeed star 2, the blowing wheel 30*b*, and the outfeed star 4, each have a main drive of their own. The transport stars 2, 30*b*, 4, can be rotationally adjusted in the change mode WM such that the grippers 40 engage between two blow molding stations 32 of the blowing wheel 30*b*. This intermediate area is designed as the receiving section 45 and comprises at least one detaching means 46. The detaching means 46 is, for instance, a stationary plunger 74, which actuates a push button 43 at the gripper 40 such that the connection between gripper head 41 and holding arm 42 is detached. The gripper head 41 remains in the receiving section 45 between two blow molding stations 31. It is then possible to attach new product-specific gripper heads 41 at the holding arms 42.

The number of receiving sections 45 for receiving the gripper heads 41 at the blowing wheel 30*b* can vary in dependence on the respective number of grippers 40 at the infeed star 2 and/or at the outfeed star 4. It can be provided, for instance, to arrange respectively two receiving sections 45 between two blow molding stations 31.

It is furthermore possible that a complete set of second receiving sections is provided at the blowing wheel 30*b*. In a first cycle of the blowing wheel 30*b* in the change mode WM, all gripper heads 41 are removed, and in a second cycle all new gripper heads from the second receiving sections are attached at the infeed star 2 and/or at the outfeed star 4. In this instance it can be provided that the transport stars or transport wheels 2, 4, 30*b* perform a cycle in a second rotational position to each other. The three rotational positions are each saved in a control apparatus.

In the change mode WM, the relative velocities of the transport stars or transport wheels 2, 4, 30*b* in relation to each other can also vary in comparison to normal operation, according to the distribution of the receiving sections 45 on the blowing wheel 30*b*. According to a preferred embodiment, the transport stars or transport wheels 2, 4, 30*b*, however, move at the same peripheral speed so that the speed difference of the transport stars or transport wheels 2, 4, 30*b* in relation to each other equals zero. This also applies for the other exemplary embodiments.

FIG. 5 show a further embodiment of a blowing wheel 30*c* with infeed star 2 and outfeed star 4 of a blow molding device with dual drive function according to the present invention. The three transport stars, i.e. the infeed star 2, the blowing wheel 30*c*, and the outfeed star 4, each have a main drive of their own. The blowing wheel 30*c* comprises blow molding stations 31, which each have a blow mold 33, a stretching rod and a blowing nozzle 50. The transport stars 2, 30*c*, 4, can be rotationally adjusted in the change mode WM such that the grippers 40 of the infeed star 2 and/or of the outfeed star 4 engage at the attaching apparatuses 52 of the blow mold, the stretching rod, and/or the blowing nozzle 50 of a blow molding station 31 to detach these for the changing process. According to the illustrated embodiment, it is provided that the grippers 40 of the infeed star 2 do not only detach the blow mold 33, the stretching rod, and/or the blowing nozzle 50, but also remove them from the blow molding station 31 and transfer them into a collection device 9. FIG. 5A exemplarily shows only one gripper 40 for each infeed star 2 and outfeed star 4. With the mold carrier 32 opened, the gripper 40 of the infeed star 2 detaches and removes the blowing nozzle 50 by actuating an attaching apparatus 52 of the blowing nozzle 50. By rotating the infeed star 2, the blowing nozzle 50 is subsequently transferred to a collection device 9 and released there. The attaching apparatus 52 is arranged laterally at the blowing nozzle 50. The blowing wheel 30c has to be advanced by the distance from the blowing nozzle 50 to the attaching apparatus 52 such that the gripper 40 of the infeed star 2 comes into engagement with the attaching apparatus 52 and can detach the mechanism of the attaching apparatus 52 and remove the blowing nozzle 50.

FIG. 5B shows a cross section through a blow molding station 31, in particular, the mold carrier 32 with the blow mold 33 and the blowing nozzle 50 with attaching apparatus 52. Prior to the changing process, the blowing nozzle 50 is moved vertically downward by its own drive, with the mold carrier 42 opened. The blowing nozzle 50 is attached at a holding device 57 via a motion screw thread 54 by means of a spring preloaded ball 55. The attaching apparatus 52 comprises a hole 60 for a first gripping arm 44-1 of the gripper 40 to pass through and a milled slot 62 as engagement point for the second gripping arm 44-2 of the gripper 40 (cf. FIG. 5C) The infeed star 2 serves as first functional element. The infeed star 2 is assigned a drive, by means of which the infeed star 2 is rotationally adjusted for the change mode WM such that the gripper 40 as actuation element of the infeed star 2 triggers a detaching mechanism, in particular the attaching apparatus 52, at the second functional element of the blow molding station 31, in particular of the blowing nozzle 50.

FIGS. 5C to 5F each show a view of a blowing nozzle 50 with attaching apparatus 52 from the top and, in particular, illustrate the detachment of the blowing nozzle 50 with attaching apparatus 52 from a blow molding station 31 (not illustrated) by means of a gripper 40 serving as actuation element. The gripper 40 performs a relative movement in relation to the blowing nozzle 50 and engages into the hole 60 and at the milled slot 62 of the attaching apparatus 52 (FIG. 5D). The ball preload is overcome in the process, and the blowing nozzle 50 is unscrewed via the motion screw thread 54, and the blowing nozzle 50 is detached from the blow mold (FIG. 5E). After the actuation of the detaching mechanism, the rotation of the blowing wheel 30c pauses briefly and the holding device 57 is pulled vertically upward by means of its drive. The blowing nozzle 50 is thus detached from the holding device 57 and only remains suspended via the attaching apparatus 52 from the gripper 40 of the infeed star 2. The gripper 40 can now strip off the blowing nozzle 50 with attaching apparatus 52 and remove it from the blow molding station 31 (not illustrated). The vertical movement can also be carried out synchronously with the twisting of the blowing nozzle 50. The blow molds can also be opened for removing the blowing nozzle 50.

For the change mode operation WM, which is not illustrated here, three drives have to take a different position than in normal work mode. The blowing nozzle 50 is moved vertically downward within the blow molding station 31; in particular, the vertical downward movement is performed at a different position along the perimeter of the blowing wheel than during normal container treatment mode so that the blowing nozzle 50 is at the same level as the grippers 40. Furthermore, the blowing wheel 30c is rotationally adjusted in relation to the infeed star 2 and/or to the outfeed star 4. As the case may be, the grippers of the infeed star 2 and/or of the outfeed star 4 have to be moved horizontally further into the engagement section of the blowing wheel 30c in order to actuate the detaching mechanism and/or to eject the blowing nozzle 50 into the collection device 9.

The illustrated principle is equally applicable to the detachment and removal of further format parts of the blow molding station 31, for instance for stretching rods, blow molds 33, stretching rod stops, etc. The principle can also be applied to further devices of a container treatment installation and/or of a packaging installation. It is possible to detach and remove heating mandrels in a similar manner, for instance, in a heating device for preforms as described in WO 2007131701 A2. WO 2007131701 A2 describes a preform heating device by means of microwaves wherein the preforms are respectively arranged in a resonator and a heating mandrel is inserted into each of the preforms. As the case may be, detaching and removing the heating mandrels can require an additional feedable drive, for instance a feedable cam, for lowering the heating mandrel. Instead of drives controlled by cams, it is also possible to use servo drives or regulatable linear drives.

FIGS. 6 to 8 show different embodiments of a shuttle system 80 with dual drive function according to the present invention. Preforms 100 or bottles are each individually transported on the shuttle units 82 through a plurality of treatment stations of the container treatment installation. Each shuttle unit 82 uses, for instance, a linear motor as drive 84, which transports the shuttle units 82 to the individual treatment stations along a rail 81 by means of magnetic forces. The rail 81 comprises a stator with a multitude of controllable coils for generating a magnetic force. The drive 84 of the individual shuttle units 82 is used dually in this case to trigger functions of individual shuttle units 82. The respective functions are triggered in a second active container treatment mode AM2 by bringing a first shuttle unit 82a, 82c, 82e into contact with a second shuttle unit 82b, 82d, 82f and thus triggering a function of the second shuttle unit 82b, 82d, 82f. The approach of the shuttle units 82a, 82b, or 82c, 82d, or 82e, 82f is achieved by a different control of the drives 84a-84f of the shuttle units 82a-82f.

The shuttle units 82a-82f respectively comprise a receiving section 86a-86f and, preceding in transport direction TR, an activating element 88a-88f. A function of the second shuttle unit 82b, 82d, 82f is triggered when an activating element 88a, 88c, 88e of a first shuttle unit 82a, 82c, 82e engages into the receiving section 86b, 86d, 86f of a second shuttle unit 82b, 82d, 82f.

According to the embodiment of a shuttle system 8a illustrated in FIG. 6, the shuttle units 82a, 82b respectively comprise a receiving section 86a, 86b with a receiving mandrel 90 for preforms 100, which receiving mandrel 90 is assigned to the top side of the receiving section 86. Provided in the extension of the longitudinal axis X of the receiving mandrel 90 are external gear teeth 94. A motion screw thread 92 can be seen between external gear teeth 94 and mandrel 90 in an internal space of the receiving section 86 on the axis X. The activating element 88 takes the form of a gear rack 89. In particular, the teeth of the gear rack 89 are designed to correspond to the external gear teeth 94.

The shuttle system 80a is used in heating ovens to heat preforms, for example. The activating element 88a of the succeeding shuttle unit 82a is pushed into the receiving section 86b of the preceding shuttle unit 82b by the succeeding shuttle unit 82a having a higher velocity. The gear rack 89a of the succeeding shuttle unit 82a engages into the external thread 94b in the internal space of the receiving section 86b of the preceding shuttle unit 82b and thus moves the receiving mandrel 90b with the preform 100 upward. By specifically positioning the preform 100 at different heights, it is possible, for instance, to specifically heat certain sections along the longitudinal axis of the preform 100 by means of heating elements, in particular by heating elements that are stationarily arranged along the heating section, for instance by infrared radiators. The relative velocity of the shuttle units 82a, 82b in relation to each other is adjusted by a different control of the drives 84 of the shuttle units 82. The height for positioning the preforms 100 can thus be specifically regulated. It is furthermore possible to regulate the duration for which the preform 100 remains at a certain positioning height. In this manner it would be possible, for instance, to heat a section of the preform 100 just below a carrying ring only immediately prior to the end of the heating section such that as little heat as possible is introduced into the carrying ring of the preform 100 prior to a blow molding process.

Initially, for instance, the shuttle units 82a, 82b have a defined distance from each other and are both operated at the same, constant speed. By increasing the speed of the succeeding shuttle unit 82a, the distance between the two shuttle units 82a, 82b is reduced, until the activating element 88a of the succeeding shuttle unit 82a engages into the receiving section 86b of the preceding shuttle unit 82b. The desired positioning height of the preform 100 being conveyed with the preceding shuttle unit 82b can be precisely adjusted by the timely reduction of the speed of the approaching succeeding shuttle unit 82a. It is possible to measure the temperature of the preforms 100 in specific positions along the heating section by means of a pyrometer, which is not illustrated in the figures. The measured values can be input to a regulating unit, which, on comparison to the target values, adjusts the drive of the shuttle units and their position in relation to each other according to the measured temperature. If, for instance, the temperature of a preform 100 is determined to be too high, the preform 100 can already be removed from the heating range prior to the end of the heating section via the drive of another shuttle unit, for instance by lowering the preform 100. In this instance, preferably only the speed of that shuttle unit is increased or reduced on which the preform is positioned that is not supposed to be further heated, so as not to influence the heating of the preforms of the other shuttle units. If the distances between the shuttle units are very close, reciprocal effects cannot be ruled out and such a correction can also take an affect on other preforms. However, it is also feasible to design the regulation in such a manner that it detects and implements the best possible heating result for all interacting shuttle units, including preforms, based on information about the tolerance limits.

FIG. 7 show the ejection of a preform 100 in a shuttle system 80b. The shuttle units 82c, 82d each comprise a receiving section 86c, 86d with a receiving mandrel 90 for the preforms 100, which mandrel is assigned to the top side of the receiving section 86c, 86d. Provided in the extension of the longitudinal axis X of the receiving mandrel 90 are external gear teeth 94, which abut on a motion screw thread 92 extending into an internal space of the receiving section 86b, 86d. The activating element 88b, 88d takes the form of a gear rack 89. In particular, the teeth of the gear rack 89 are designed to correspond to the external gear teeth 94.

The activation of the eject function of the preceding shuttle units 82d is performed according to the activation of the vertical movement of the receiving mandrel 90 as described in FIG. 6. The shuttle units 82c, 82d have an inclined surface 98 for ejecting the preforms 100 (FIG. 8B). In this case, the preform 100* with its receiving mandrel 90 is lowered by the activation of the preceding shuttle unit 82d by means of the activating element 88c of the following shuttle unit 82d until a carrying ring 102 of the preform 100* comes into contact with a stripper element 96, which detaches the preform 100* from the receiving mandrel 90 such that the preform 100* is ejected via the inclined surface 98 of the shuttle unit 82d into a collection device 99 or the like. In such a manner, it is possible to eject any preform 100 or another article being transported by a shuttle system 80 at an optional point within a filling installation or the like. Preferably, such an ejection is performed after an inspection in which defective preforms 100* are detected.

For instance, shuttle systems with appropriate holding devices instead of the receiving mandrels can also be used for transporting bottles. The inspection unit then detects bottles that are imperfectly blow molded, imperfectly filled, imperfectly labeled, or the like, and have to be sorted out. Behind the inspection devices are collection devices, in particular chutes or the like, for collecting the defective bottles. The method can also be used in normal heating operation if a uniform heat profile is to be generated along the perimeter of the preform 100.

FIG. 8a shows the use of a magnetic shuttle system 80c during preferential heating of preforms 100, in which specific sides of the preforms 100 are respectively faced toward the heating elements 110 and are specifically heated for a defined period of time.

The shuttle units 82e, 82f do not have a motion screw thread below the receiving mandrel 90. Instead, on the activating element 88e of the shuttle unit 82e engaging into the receiving section 86f of the preceding shuttle unit 82f, the succeeding shuttle unit 82e effects a rotation of the receiving mandrel 90f such that the preform 100, although it remains at the same height, can be turned back and forth. Specific perimeter sections of the preform 100 can thus remain facing toward the heating elements 110, which are arranged laterally from the transport lane or transport rail 81, for a longer or shorter duration, so that the preform 100 is heated more or less intensely in this perimeter section. The rotation of the preform 100 is achieved by continually changing the distance of the shuttle units 82e, 82f to one another. This system makes it possible to dispense with an extra drive for each shuttle unit 82e, 82f for rotating the preforms 100 in the heating oven. In analogy to the above description, the temperature profile can also be regulated by means of a regulating unit and a temperature sensor.

Recent developments in container treatment technology tend toward a stretching rod drive for a blow molding device, which drive is controlled by means of a servomotor or linear motor. After a format change, the stretching speed can thus be simply adjusted to another preform to be blow molded or to a new bottle form, as the case may be. For this purpose, however, each blow molding station 31 has to have a drive of its own, thus clearly increasing the costs for such an installation. FIG. 9 show three blow molding stations 32-1, 32-2, 32-3 of a blow molding device with dual drive function. The blowing wheel 30d has a direction of rotation DR so that the blow molding process first starts in blow molding station 31-1. Here, only every other blow molding station 31 has a stretching drive 72-1, 72-3. On the side facing toward the first, preceding blow molding station 31-1, the stretching rod 70-2 of the second blow molding station 31-2, which does not have its own stretching drive, comprises an engagement element 74a for a driver element 76-1b of the stretching rod 70-1 of the first blow molding station 31-1. On the side facing toward the third blow molding station 31-3, the stretching rod 70-2 furthermore comprises two engagement elements 74b, 74c, which are arranged on top of each other, for a driver element 76-3a of the stretching rod 70-3 of the third blow molding station 31-3, which is in each case arranged above the engagement element 74a. The drive-less stretching rod 70-2 is controlled via the driver elements 76-1a, 76-3b engaging at the engagement elements 74a, 74b, 74c. The stretching rod 70-2 can be journaled in a guide, which is not illustrated here.

Before the stretching process can take place, the blow mold 33 is opened together with the mold carrier 32 (=33$_{open}$) and the preform 100 is introduced. As the stretching processes take place one after the other on a blowing wheel 30d, which continuously rotates in the direction of rotation DR, the non-driven stretching rod 70-2 is first pushed along by the first drive 72-1 of the preceding blow molding station 31-1, and then by the succeeding blow molding station 31-3. In particular, the driver 76-1b of the stretching rod 70-1 of the first blow molding station 31-1 presses onto the engagement element 74a of the drive-less stretching rod 70-2 and thus pushes it along downward (FIGS. 6A to 6C). The engagement element 74a of the drive-less stretching rod 70-2 and the driver element 76-1a of the stretching rod 70-1 are arranged such that the drive-less stretching rod 70-2 has covered approximately 50% of the distance inside the blow mold 33 when the stretching rod 70-1 is completely inserted into the blow mold 33 of the first blowing station 31-1 (FIG. 1C). The driver element 76-3a of the stretching rod 70-3 subsequently presses onto the lower engagement element 74b on the side of the non-driven stretching rod 70-2 facing toward the third, succeeding blow molding station 31-3 and thus pushes the stretching rod 70-2 further into the blow molding station 30-2 (FIGS. 6D, 6E).

The driver element 76-3a of the stretching rod 70-3 of the third, succeeding blow molding station 31-3 is assigned a coupling element or a spring element 78-3. Furthermore, the movement of the non-driven stretching rod 70-2 is limited toward the bottom by a stop element 79-2. These elements 78-3, 79-2 prevent the stretching rod 70-2 of the middle blow molding station 31-2 without a drive of its own from being rammed, due to the mass inertia, into the base 33* of the blow mold 33 of the middle blow molding station 31-2 by the stretching rod 70-3 of the succeeding blow molding station 31-3. The spring element 78-3 is more powerful than the resistance of the acceleration forces (provided there are any present at all, as the stretching rod 70-2 is already being accelerated by the driver 76-1a of the preceding blow molding station 31-1) and of the preform 100, or, alternatively, of the blowing pressure in the blow mold 33 during stretching. According to a further embodiment (not illustrated), the elements 76-3b and 76-1a are arranged at such a height in relation to the elements 76-1b and 76-3a that they are positioned in the same manner toward each other at each driven stretching rod 70-3 and 70-1.

The retraction movement of the non-driven stretching rod 70-2 is performed as follows: The stretching rod 70-2 of the blow molding station 31-2 is pushed along upward by the succeeding blow molding station 31-3 via the driver element 76-3a of the third stretching rod 70-3, by the said driver element 76-3a pressing from below against the upper engagement element 74c facing toward the third blow molding station 31-3. As the stretching process is usually already finished prior to the end of a blow molding process, this movement can be performed solely by the stretching rod 70-3 of the third blow molding station 31-3. In the initial position, the non-driven stretching rod 70-2 remains slightly closer to the blow mold than the succeeding stretching rod 70-3. It would also be feasible that the preceding blow molding station 31-1 pushes along the drive-less stretching rod 70-2 of the blow molding station 31-2 for the entire return distance back into the non-work position of the drive-less stretching rod 70-2 and for this purpose is moved a bit further upward than is actually necessary for its own rest position (not illustrated here). A separate driver could be arranged at the right side of the stretching rod 70-2 for this purpose. It would also be feasible that the middle stretching rod 70-2 is indirectly connected with the blowing wheel by a spring and is automatically pulled back into the rest position—a decoupling mechanism could be present for this purpose, which only temporarily couples the drivers 76-3a and 76-1b with the stops 74a-c (not illustrated).

A friction lining, for instance, can be arranged at the drive-less stretching rod 70-2 of the blow molding station 31-2, which friction lining is impinged by a spring preloaded plunger such that the stretching rod 70-2 remains in the appropriate position when no driver 76-1b, 76-3a is in engagement with the said stretching rod 70-2. As an alternative, the other stretching rods 70-1, 70-3 could also be constantly in engagement, for instance, via springs, with the non-driven stretching rod 70-2.

According to a further embodiment, which is not illustrated here, a appropriate drive is only missing at every third blow molding station, and the adjacent blow molding stations with a drive are not coupled with each other. A better process control is enabled in such an instance, wherein the quality of two adjacent blow molding stations is averaged and the velocity profile is adjusted accordingly. This is in particular possible when only every third blow molding station is without a drive and no coupling takes place between two adjacent stations with drives. It would also be feasible that a stator receives the runners of a plurality of adjacent stretching rods, which are thus individually controlled and movable, wherein nevertheless only one drive or one frequency converter is necessary for a plurality of blow molding stations.

The principle as described in FIG. 9 can also be applied for other rotary-type devices, in which parts have to be transported in perpendicular to the transport direction. These include, for instance: Return air tubes in a filler; filling pipes in long-tube fillers; blowing nozzles in blow molding devices; centering heads in labeling devices; turntables in labeling devices, in particular if the bottles are transferred by neck handling from a transport device or the like to the labeling device and subsequently fed to further processing machines by neck handling; lances for being inserted into bottles in plasma coating or plasma sterilization; lances for being inserted into bottles or preforms for sterilization or for rinsing, for instance spray heads for sterilizing gas, sterilizing liquid, e-beam emitters, etc.; base section of the blow mold in the blow molding stations of a blow molding device; parts of the base section of the blow mold in the blow molding stations of a blow molding device, in particular for guiding the preform downward in axial direction during the stretching process or for adjusting the material distribution in the standing ring section of the bottle (=Powerflex); preform rinser with lances being inserted for blowing air, in particular ionized air, into preforms; clampings (comparable to centering heads) in the alignment of the bottles with the blow molding device, etc.

According to the explanations for FIG. 9, these devices and methods also solve the task set in the beginning. In a rotary-type container treatment machine with a plurality of container treatment stations, in which these container treatment stations each comprise at least one movable functional element, it is in general possible for at least one drive of a container treatment station to carry out at least a part of the movement of the functional element of an adjacent container treatment station. In particular, the movement of the functional element can additionally be carried out at least in parts or temporarily by the drive of a further adjacent container treatment station.

The invention has been described with reference to a preferred embodiment. Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

LIST OF REFERENCE CHARACTERS

1 Labeling device
2 Infeed star
3 Labeling transport star
4 Outfeed star
5 Labeling unit
6 Gripper cylinder
7 Plunger
8 Labeling unit with labeling magazine
9 Collection device
10 Stripper and slide
11 Turntable
11p Mushroom-shaped attaching element
12 Magazine
13 Control unit
15 Attaching apparatus
16 Shaft
17 Drive
18 Bayonet lock
19 Spring
20 Element
20a Recess
20b Pressure spring
20c Recess
21 Free end
22 Cutting device
24 Roll with label material
25 Guide roller
26 Counter-cutting roller
27 Cutting blade
28 Glue roller
30 Blowing wheel
31 Blow molding station
32 Mold carrier
33 Blow mold
34 Drive
35 Cam control
36 Unlocking mechanism
38 Unlocking means
38* Free end
39 Attaching means
40 Gripper
41 Gripper head
42 Holding arm
43 Push button
44 Gripping arm
45 Receiving section
46 Detaching means
50 Blowing nozzle
52 Detaching mechanism
54 Motion screw thread
55 Spring preloaded ball
57 Holding apparatus
60 Hole
62 Milled slot
70 Stretching rod
72 Stretching drive
74 Engagement element for driver element
76 Driver element
78 Clutch spring element
79 Stop element
80 Shuttle system
81 Rail
82 Shuttle unit
84 Drive
86 Receiving section
88 Activating element
89 Gear rack
90 Receiving mandrel
92 Motion screw thread
94 External gear teeth
96 Stripper element
98 Inclined surface
99 Collection device
100 Preform
102 Carrying ring
110 Heating element
AM Work mode
DR Direction of rotation
TR Transport direction
WM Change mode
WP Change position

I claim:

1. A method for operating a container treatment installation with at least one container treatment device (1),
wherein the container treatment device (1) has at least one first functional element (6) with a first drive for at least one first work function of the at least one first functional element (6) during active container treatment mode and
wherein the container treatment installation comprises at least one second functional element (11),
wherein the first functional element (6) comprises at least one first actuation element (7), the method comprising:
setting, in a first active container treatment mode (AM), the at least one first functional element (6) such that the at least one first actuation element (7) performs no function on the second functional element (11), and
moving, repositioning, or adjusting, to a second active container treatment mode or for a third change operating mode (WM), the at least one first functional element (6) by the first drive such that the at least one first actuation element (7) triggers or activates a function of the second functional element (11) through contact with the at least one second functional element (11) of the container treatment installation.

2. The method as recited in claim 1 further comprising controlling and monitoring, with a control unit (13), the moving, reposition, or adjusting of the first drive of the at least one first functional element (6) from the first active container treatment mode (AM) to the second active container treatment mode or to the third change operating mode (WM).

3. The method as recited in claim 2 wherein the at least one second functional element (11) is an exchangeable format part or a mechanism (15, 18) connected thereto, which is arranged at the container treatment device (1) by means of an attaching and detaching mechanism (15, 18), wherein the format part, in the first active container treatment mode (AM), is not in contact with the actuation element (7) of the first functional element (6), and wherein, in the third change operating mode (WM), the detaching mechanism (15, 18) of the format part is activated by the actuation element (7) of the first functional element (6) and the attachment of the format part at the container treatment device (1) is detached.

4. The method as recited in claim 2 wherein the container treatment device (80) comprises at least one second functional element (82b), which is identical or at least largely identical to the first functional element (82a) and also comprises an actuation element (88a, 88b) and a drive (84a, 84b), and wherein, in a second active container treatment mode (AM2), the first functional element (82a) is moved by the first drive (84a) such that the first actuation element (88a) acts on the second functional element (82b) and triggers an adjustment or a further function of the second functional element (82b).

5. The method as recited in claim 4 wherein a plurality of identical functional elements (82) are arranged consecutively in a series, and wherein, in each case, the drive (84) specifically controls at least one of the functional elements (82) and thus the function of at least one adjacent functional element (82) is specifically activated.

6. The method as recited in claim 2 wherein the first functional element (70-1) and the second functional element (70-2) perform the same function in the container treatment device, wherein the second functional element (70-2) does not comprise a drive of its own, but is driven via the actuation element (76) of the first functional element (70-1).

7. A container treatment installation comprising:
at least one container treatment device (1) including at least one first functional element (6) with a first drive for driving at least one first work function of the first functional element (6) during active container treatment mode (AM) and at least one first actuation element (7), and
at least one second functional element (11),
wherein, in a first active container treatment mode (AM), the at least one first actuation element (7) has no contact with a contact point of the second functional element (11), and
wherein, for a second active container treatment mode or for a third change operating mode (WM), the at least one first functional element (6) is re-positionable by the first drive such that the at least one first actuation element (7) contacts the contact point of the second functional element (11), whereby a function of the second functional element (11) is activatable.

8. The container treatment installation as recited in claim 7 further comprising a control unit (13) for controlling the positioning of the at least one first functional element (6) by the at least one first drive.

9. The container treatment installation as recited in claim 8 wherein the at least one first functional element (6) is movable into a rotary or a linear position which is not approached in the active container treatment mode (AM).

10. The container treatment installation as recited in claim 9 wherein the container treatment device is a labeling device (1) for labeling articles, with a labeling transport star (3) and a labeling unit (8), wherein the first functional element is a gripper cylinder (6) of the labeling unit (8), which is assigned a plunger (7) as actuation element, and wherein the second functional element is a positioning means (11) for the articles, which positioning means (11) is arranged at the labeling transport star (3) of the labeling device (1) by a detachable attaching mechanism.

11. The container treatment installation as recited in claim 9 wherein the container treatment device is a blow molding device with a blowing wheel (30b), a drive assigned to the blowing wheel (30b), an infeed star and/or outfeed star (2, 4) with gripper units (40) consisting of gripper head (41) and at least one holding arm, (42), wherein the blowing wheel (30b) comprises a plurality of blow molding stations (31), wherein respectively one blow molding station (31) is respectively one first functional element, wherein a receiving pocket (35) for a gripper unit (40) is respectively formed at one or between two adjacent blow molding stations (31), wherein the receiving pocket (35) has at least one unlocking means (38), wherein, in the third change operating mode (WM), the gripper heads (41) are unlockable from the gripper units (40) and receivable into the receiving pockets (35).

12. The container treatment installation as recited in claim 9 wherein the container treatment device is a blow molding device with a blowing wheel (30c) and a drive assigned to the blowing wheel (30b), an infeed star and/or outfeed star (2, 4) with gripper units (40), wherein the blowing wheel (30c) comprises blow molding stations (31) with blowing nozzles (50), stretching rods and blow molds (33), wherein respectively one gripper unit (40) of the infeed star (2) and/or outfeed star (4) is respectively one first functional element, and wherein at least one gripper arm (44) is formed as actuation element, wherein, in the third change operating mode (WM), the blowing nozzles (50), stretching rods or blow molds (33) are unlockable and removable from the blowing wheel (30c).

13. The container treatment installation as recited in claim 9 wherein the container treatment device is a blow molding device with a blowing wheel (30a), wherein the first functional element is a first blow molding station (31) with mold carrier (32) and blow mold (33) with a first drive for opening the first blow mold (33) after the blowing process, and wherein the at least one second functional element is a second, adjacent blow molding station (31), wherein each of the blow molding stations (31) can take a first opening position ($31_{open}$) and a second opening position ($31_{max}$) wherein, in the second opening position ($31_{max}$) of the respective blow molding station (30) at least one contact point is formed between the at least one actuation element, which takes the form of an unlocking means (38) of this blow molding station (31), and the at least one unlocking mechanism (36) of the adjacent blow molding station (31), with the attachment of the blow mold (33) in the adjacent blow molding station (31) being at least partly detachable by means of the actuation element.

14. The container treatment installation as recited in claim 9 wherein the container treatment device is a transport system (80) with a plurality of transport units (82), wherein each of the transport units (82) comprises an own drive (84), a receiving section (86) for an activating element (88) and an activating element (88), and wherein each transport unit (82) is employable as first functional element and/or as second functional element.

15. The container treatment installation as recited in claim 9 wherein the container treatment device is a blow molding device with a blowing wheel (30d) and a plurality of blow molding stations (31), wherein a first stretching rod (70-1) of a first blow molding station (31-1) comprises a first drive (72-1) and at least one first driver element (76-1b) and forms a first functional element, wherein a third stretching rod (70-3) of a third, succeeding blow molding station (31-3)

comprises a third drive (72-3) and at least one third driver element (76-3*a*) and also forms a first functional element and wherein a second, drive-less stretching rod (70-2) has at least one, preferably two engagement elements (74*b*, 74*c*) for the first driver element (76-1*b*) and at least one engagement element (74*a*) for the third driver element (76-3*a*) and forms the second functional element.

\* \* \* \* \*